Jan. 5, 1960

W. J. RADY 2,920,262

GENERATOR REGULATION

Filed Nov. 3, 1955

INVENTOR.
William J. Rady
BY John A. Marvin
His Attorney

United States Patent Office 2,920,262
Patented Jan. 5, 1960

2,920,262

GENERATOR REGULATION

William J. Rady, Anderson, Ind., assignor to General Motors Corporation, Detroit, Mich., a corporation of Delaware Application November 3, 1955, Serial No. 544,691

3 Claims. (Cl. 322—28)

This invention relates to control circuits for alternators and generators and more particularly to a control system wherein a carbon pile regulator is used to control the field excitation to compensate for fluctuations in electrical loads and/or speeds which are imposed on the generator.

It is an object of the present invention to increase the output voltage of a generator, or alternator, that has its field controlled by a carbon pile regulator when the generator is operating at a reduced speed and/or is producing a low output voltage by using the voltage of the field to reduce the voltage drop across the windings of the regulator.

Another object of the present invention is to further reduce the energization of the actuating windings of a carbon pile regulator during periods when the potential drop across the pile is low. This object is accomplished by impressing the potential from the low potential side of the carbon pile on the low potential side of the actuating windings to reduce the voltage drop thereacross.

A further object of the present invention is to reduce the resistance drop across a carbon pile voltage regulator in the field circuit of a variable speed D.C. generator during periods when the speed of the generator is reduced by using the voltage of the field to reduce the energization of the actuating coil winding of the regulator whenever the field voltage exceeds a predetermined value.

Further objects and advantages of the present invention will be apparent from the following description, reference being had to the accompanying drawings wherein preferred embodiments of the present invention are clearly shown.

Figure 1:
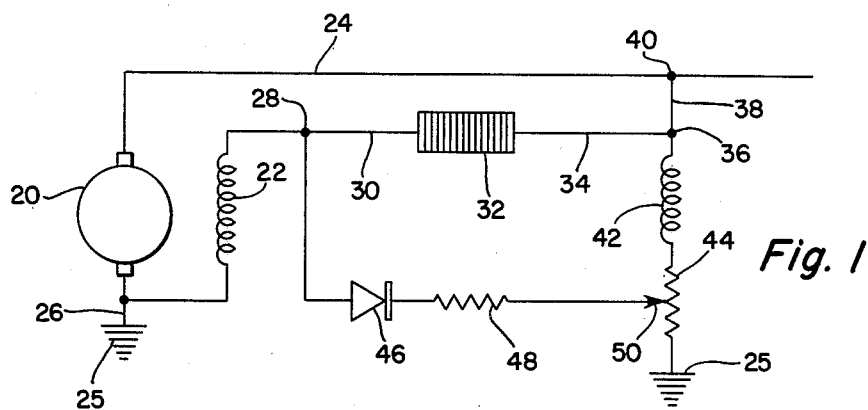
Figure 1 shows a circuit diagram of the carbon pile voltage regular circuit incorporating the present invention.

Referring to Figure 1, a conventional D.C. generator 20, driven by a variable speed vehicle engine, not shown, has a shunt field winding 22, a lead 24 connected with a grounded load, not shown, and a lead 26 connected to ground 25. The shunt field winding 22 has one terminal end connected to ground 25 and has its other terminal end connected through a junction 28, a lead 30, a carbon pile resistance stack 32 and a lead 34 which is connected through a junction 36 and a lead 38 to the lead 24 at junction 40.

The resistance of the carbon pile regulator stack 32 is controlled by the energization of the coil 42. The carbon pile regulator may be of any suitable type such as disclosed in Patent 2,565,989, assigned to the assignee of the present invention, and, when used, will control the energization of the field 22 in response to the potential of junction 40. The actuating coil winding 42 of the regulator has one end connected through junction 36 and lead 38 to the junction 40 and has the other end connected through a resistance 44 to ground 25.

The main feature of the present invention is directed to the inclusion of a single phase rectifier 46, a resistance 48 and a variable position tap 50 which are arranged so the potential at junction 28 will be impressed to modify the action of the carbon pile voltage regulator under certain conditions as will be hereinafter discussed.

Figure 2:
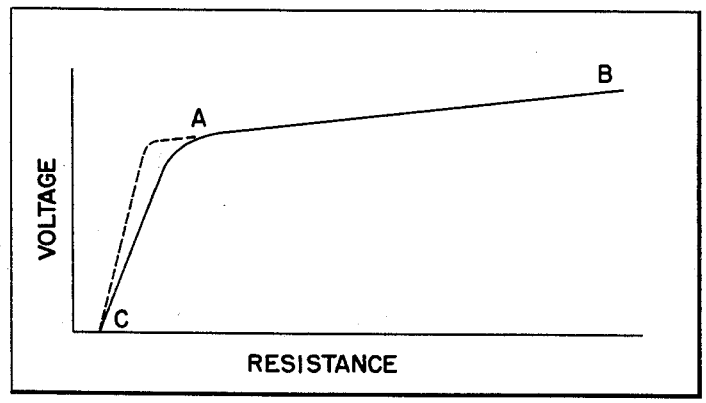
Figure 2 shows how the resistance of a carbon pile regulator will vary the D.C. output of a generator and how this output may be modified according to the present invention.

Referring to Figure 2 wherein the voltage ordinate is taken as the generator output potential at junction 40 and the resistance abscissa is the value of the carbon pile stack 32 resistance, it will be observed that in solid line portion of the curve AB, a small change in potential and junction 40 will produce a large change in the resistance of the carbon pile stack 32 and that over the portion from C to A on the solid line curve, a large change in the voltage potential at junction 40 will produce only a small change in the resistance value of the stack 32.

Figure 3:
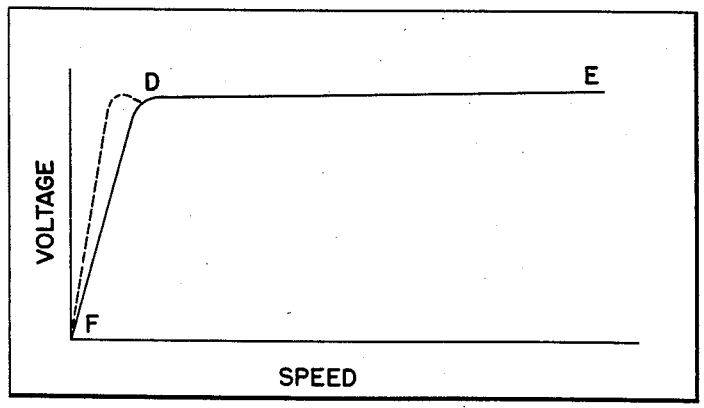
Figure 3 shows how the voltage speed curve of the generator in Figure 1 may be modified when the circuit of the present invention is used with a carbon pile regulator.

In Figure 3 the speed of rotation of the generator 20 is shown as plotted against the voltage potential at junction 40 when the carbon pile voltage regulator is operating. In this curve, Figure 3, it will be observed that at higher generator 20 speeds, the carbon pile regulator maintains the voltage output of the generator 20 substantially at a constant value as indicated by the portion DE of the solid curve. Further, it will be observed in Figure 3 in the portion DF of the solid curve, that at lower generator speeds, the voltage output is sharply reduced. The present invention is directed to a circuit arrangement for a carbon pile regulator which will cause the voltage to remain at a high value as shown by the dotted curve portion in Figure 3 when the speed of the generator is reduced to a point where normally the carbon pile would cause the voltage to be appreciably lowered.

It is well known a carbon pile voltage regulator always has a residual resistance. This is illustrated by the location of point C in Figure 2. Further, one of the characteristics of a carbon pile regulator is that the resistance of the carbon pile stack varies with the voltage impressed across the actuating coil winding. The coil winding is indicated by numeral 42 in Figure 1. The effect of the present invention is clearly shown by the dotted portions of the curves in the Figures 2 and 3. This effect is achieved by abnormally reducing the voltage across the coil winding 42 so that the voltage impressed across the coil 42 is abnormally less than the voltage which is present at junction 36 during the periods when the speed of the generator is reduced than were the components of the present invention not included in the circuit.

To accomplish the above, the rectifier 46, the resistance 48 and the tap 50 on resistance 44 are placed in the circuit with the carbon pile regulator. When the generator 20 speed is reduced from E to D in Figure 3, there will occur a slight drop in voltage between junction 36 and ground 25. This will reduce the voltage impressed on the coil winding 42 and, as shown in Figure 2, will cause the resistance to slightly decrease. This is shown by the portion BA in Figure 2. When the resistance of the carbon pile 32 decreases, the voltage across the field 22 will be increased as both the pile 32 and field 22 are connected in series.

When the speed of the generator 20 is decreased further to the point D in Figure 3, it is apparent that a small further decrease in speed will cause a large change in the voltage. This effect, when translated to Figure 2, shows that a large change in voltage will cause only a small change in the resistance of the carbon pile 32. When this occurs, the voltage of the field 22 will not be increased sufficiently to maintain a high voltage at low generator 20 speeds and the voltage will drop rather suddenly at a predetermined point which is indicated by point A in Figure 2 and point D in Figure 3. These points A and D represent the point where a drastic reduction in the resistance of the carbon pile 32 is required to maintain a satisfactorily high voltage between junction 36 and ground 25. The voltage impressed on field 22 at this point will be substantially equal to the voltage between junction 28 and ground 25. Further, it may be assumed that the voltage drop between tap 50 and ground 25 is substantially constant because the regulator holds the voltage between point 36 and ground substantially constant and, therefore, the voltage at any other point in the circuit to ground will be held substantially constant. The tap 50 is adjusted on resistance 44 so the voltage between tap 50 and ground 25 will equal the voltage between junction 28 and ground when generator and carbon pile are at points A and D on the curves.

When the circuit, according to the present invention, is included with a carbon pile voltage regulator in a generator circuit, and the speed of the generator falls below the point D on the curve in Figure 3, the resistance of the carbon pile 32, as shown in Figure 2, will fall below point A. When the resistance of pile 32 is reduced, the voltage at junction 28 will be increased. When the voltage at junction 28 is increased above the voltage as determined by the setting of tap 50, current will flow from junction 28 through rectifier 46, resistance 48 and form a parallel circuit with winding 42. This current will increase the voltage drop between tap 50 and ground above that which would be obtained by the current which would normally pass through winding 42 and resistance 44. Thus, the voltage across the winding 42 will be decreased without a substantial change in the voltage between junction 36 and ground. This decrease in voltage in winding 42 will cause the resistance of pile 32 to be decreased and, when the resistance of the pile 32 is decreased under these conditions, the voltage impressed on the field will be further increased. Thus, if the various resistances of 48 and 44 and tap 50 are properly selected, the voltage output of the generator 20 at low speeds can be maintained constant or may be increased, if desired, as shown by the dotted curve in Figure 3.

From the above, it is evident that, at high speeds, the voltage across the field 22 will be very low as the resistance of the carbon pile 32 is high. The rectifier 46 under these conditions will prevent the current from flowing through coil 42, a portion of resistance 44, tap 50, resistance 48 to the field 22 so that the action of the regulator will not be hampered by a by-passed current at high speeds. The resistance 48 may be of any suitable value and is included to limit the flow of current from junction 28 to ground to the desired amount. That is, the value of resistance 48 should be selected to limit the dotted hump in Figure 3 to the desired amount so the field voltage will enjoy the effect of the decreased energization of the reduction in voltage on coil 42. The tap 50 as previously indicated is positioned on the resistance 44 so the current will flow when the voltage of junctions 28 and 36 are at the proper value as determined by the electrical characteristics of the various components of the system.

While in the embodiment shown, a D.C. generator is utilized, it is to be appreciated that the control of the carbon pile regulator action may also be employed if the D.C. generator is changed to an alternator rectifier unit wherein the carbon pile regulator is used in the manner heretofore set forth to vary the field of the alternator.

While the embodiments of the present invention as herein disclosed constitute preferred forms, it is to be understood that other forms might be adopted.

What is claimed is as follows:

1. A generating system, comprising; a generator, an exciting field winding, a carbon pile regulator having an actuating coil connected to be responsive to voltage of a load circuit connected to said generator and a variable resistance connected in a circuit to said field for varying the output of said generator in response to voltage fluctuations in said load circuit, and a means including a resistance and rectifier circuited in parallel with said actuating coil for abnormally reducing said variable resistance when the speed of said generator falls below a predetermined value.

2. A generating system, comprising; a variable speed D.C. generator having a shunt field and a load circuit, a carbon pile regulator having a variable carbon pile resistance in circuit with said field and an actuating coil and a coil resistance connected to be responsive to voltage of the load circuit for varying said variable resistance in response to fluctuations in said load circuit, and a means including a resistance and rectifier connected in parallel with said coil and in series with at least a portion of said coil resistance for abnormally reducing said variable resistance when the voltage of said load circuit falls below a predetermined value.

3. A generating system comprising; a variable speed generator having a D.C. load circuit and field circuit each having a variable D.C. voltage, a carbon pile regulator having an actuating coil connected to be responsive to the voltage of the load circuit and a variable resistance controlled by said actuating coil and connected in a circuit to said field for varying the voltage of said field, and a means for abnormally reducing said resistance when the voltage of said load circuit is below a predetermined value, said means including; a series resistance connected in series circuit with said actuating coil, and a circuit connected in parallel with said field and said coil including; a resistance, a rectifier and a tap on said series resistance.

References Cited in the file of this patent

UNITED STATES PATENTS

| | | |
|---|---|---|
| 2,427,809 | Rady et al. | Sept. 23, 1947 |
| 2,694,173 | Austin et al. | Nov. 9, 1954 |
| 2,707,263 | Jorgenson | Apr. 26, 1955 |
| 2,754,470 | Franklin | July 10, 1956 |

FOREIGN PATENTS

| | | |
|---|---|---|
| 990,301 | France | June 6, 1951 |
| 544,101 | Great Britain | Mar. 27, 1942 |